(12) United States Patent
Madour et al.

(10) Patent No.: US 7,630,354 B2
(45) Date of Patent: Dec. 8, 2009

(54) OPTIMIZED PACKET-RESOURCE MANAGEMENT

(75) Inventors: Lila Madour, Kirkland (CA); Karim Shafik, Dollard des Ormeaux (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 679 days.

(21) Appl. No.: 11/124,238

(22) Filed: May 9, 2005

(65) Prior Publication Data

US 2005/0195787 A1 Sep. 8, 2005

Related U.S. Application Data

(62) Division of application No. 09/746,274, filed on Dec. 20, 2000, now Pat. No. 6,912,214.

(60) Provisional application No. 60/195,378, filed on Apr. 7, 2000.

(51) Int. Cl.
*H04L 12/64* (2006.01)
(52) U.S. Cl. .................. 370/340; 370/354
(58) Field of Classification Search ........... 370/340, 370/354
See application file for complete search history.

(56) References Cited

U.S. PATENT DOCUMENTS 5,553,239 A 9/1996 Heath et al.
5,708,656 A 1/1998 Noneman et al.
2006/0046689 A1* 3/2006 Kim .................. 455/406

FOREIGN PATENT DOCUMENTS

WO 99/12380 A1 3/1999
WO WO 00/01173 A1 1/2000

OTHER PUBLICATIONS

3GPP2.A.S0001-0.1 Specification, Release A, Jun. 2000, Section 2.14.7, pp. 121-127.
3GPP2 Access Network Interfaces Interoperability Specification, Release A, 3GPP2 A.S0001, Jan. 18, 2000, pp. 111-182.

* cited by examiner

*Primary Examiner*—Melvin Marcelo

(57) ABSTRACT

A system and method for optimizing the use of packet-resources by releasing a hanging packet-data connection when a Mobile Station (MS) performs a power-down while involved in a dormant packet-data session. A Base Station Controller (BSC) sends a message to a Mobile Switching Center (MSC) indicating that the MS has powered down. The MSC determines that the packet-data session is dormant, and sends an instruction to the BSC in a class-0 connectionless transaction to release network resources associated with the packet-data session. The BSC then sends an instruction to a Packet Control Function (PCF) to tear down the associated resources, and the packet-data connection is released by a Packet Data Service Node (PDSN) in response to the tearing down of the resources by the PCF.

9 Claims, 8 Drawing Sheets

OPTIMIZED PACKET-RESOURCE MANAGEMENT

PRIORITY STATEMENT UNDER 35 U.S.C. § 119(e) & 37 C.F.R. § 1.78

This application is a divisional of application Ser. No. 09/746,274, filed Dec. 20, 2000 and now U.S. Pat. No. 6,912,214.

This nonprovisional application claims priority based upon the prior U.S. provisional patent application entitled, "Optimized Resource Management at Dormant Handoff With Packet Resource Management at Power Down of a Dormant Mobile Station", application No. 60/195,378, filed Apr. 7, 2000, in the names of Lila Madour and Karim Shafik.

BACKGROUND OF THE INVENTION

1. Technical Field of the Invention

This invention relates to telecommunication systems and, more particularly, to a system and method for optimizing the use of packet-resources in a wireless access network.

2. Description of Related Art

In wireless packet-data systems like the General Packet Radio System (GPRS), the legacy network dedicated to voice has been functionally separated from the packet-data network. In CDMA 2000, however, the packet-data features have essentially been added on top of the existing circuit-switched voice system. Under certain circumstances, this can cause serious inefficiencies in the network. Two examples are when an authentication failure is reported at the Mobile Switching Center (MSC) after a data path is set up, and when a mobile station (MS) powers down during a dormant point-to-point protocol (PPP) data session.

In the case of the authentication failure, an authentication center (AC) may be co-located with the MSC or with a Home Location Register (HLR). When an MS attempts to use a packet-data service, the MSC and the Base Station Controller (BSC) serving the MS take steps to allocate a radio traffic channel. In parallel, the BSC begins setting up a data path between the MS and a Packet Data Service Node (PDSN). In many cases, the path between the MS and the PDSN may be set up faster than the authentication is reported to the MSC. If an authentication failure is reported to the MSC after the data path is set up between the MS and the PDSN, the MSC deallocates the radio resources that were allocated to the MS, but presently does not do anything to release the data path.

The data path that remains after the radio resources are released is referred to as a "hanging PPP connection" or a "hanging A10 connection." A PPP connection is a very expensive network resource; it consumes critical PDSN memory capacity. If there are a large number of authentication failures, then there may be a large number of hanging PPP connections. Each connection is eventually released when a PPP timer expires at the PDSN; however, the timer is typically set for several hours in order to avoid prematurely disconnecting PPP sessions when a user temporarily stops sending or receiving data. Therefore, the PPP resources are needlessly tied up for several hours until the PPP timer expires.

Likewise, a hanging PPP connection may be experienced when an MS powers down during a dormant packet-data session. A dormant packet-data session is one in which a packet-data session has been established, but no data has been exchanged for a long period of time. For example, a user may download information from the PDSN, and then spend a considerable amount of time reading it. Under these circumstances, when an inactivity timer expires, the MSC deallocates the radio traffic channel. The PPP connection, however, is maintained. If the user then requests or sends additional data, the dormant packet-data session is reactivated by reallocating a traffic channel so that the data can be transferred.

If an MS is conducting an active packet-data session, and the user powers down the MS, a message is sent from the BSC to the MSC over the traffic channel notifying the MSC that the MS has powered down. The MSC de-registers the user and sends a response back to the BSC. The BSC notifies the PCF that the user has powered down via the BSC-PCF interface. At reception of the power-down notification from the BSC, the PCF triggers a message to the PDSN indicating that the A10 connection should be released. This way, the PDSN removes any PPP states associated with that user.

A PPP inactivity timer may also be used internally within the PDSN. The timer may be initiated at reception of the power-down command from the PCF. The PDSN would tear down the PPP states only after the timer expires. This provides a grace period to the PDSN, in case the user decides to power up again right away.

However, users often power down their MSs when they finish reading downloaded data, and the PPP session is not reactivated. When the user powers down the MS during a dormant packet-data session, a problem arises because only the radio network is notified that the MS has powered down. The MSC does not know that an instruction needs to be issued to the BSC to release the A10 connection at the PDSN. The PPP connection is left hanging, thus wasting an expensive network resource. As discussed above, the PPP connection is eventually released when the PPP timer expires after several hours, but the resource is needlessly tied up until this occurs.

In order to overcome the disadvantage of existing solutions, it would be advantageous to have a system and method for optimizing the use of packet-resources in a wireless access network by eliminating hanging PPP connections. The present invention provides such a system and method.

SUMMARY OF THE INVENTION

In one aspect, the present invention is a method of optimizing the use of packet-resources by eliminating a hanging packet-data connection when a Mobile Station (MS) performs a power-down while the packet-data session is in a dormant state. The method is performed in a wireless access network having a Mobile Switching Center (MSC), a Base Station Controller (BSC), a Packet Control Function (PCF), and a Packet Data Service Node (PDSN) providing a packet-data session with a packet-data network. The method includes the steps of sending a message from the BSC to the MSC indicating that the MS has powered down; determining in the MSC that the packet-data session is dormant; and sending an instruction from the MSC to the BSC to release network resources associated with the packet-data session. The BSC then sends an instruction to the PCF to tear down the associated resources, and the packet-data connection is released by the PDSN in response to the tearing down of the resources by the PCF.

In another aspect, the present invention is a method of optimizing the use of packet-resources by eliminating a hanging packet-data connection when an MS performs a power-down while the packet-data session is in a dormant state. The method includes the steps of receiving in the BSC, a power-down registration from the MS; sending from the BSC, an update message to the PCF that includes an indication that the MS has powered down; sending an indication from the PCF to the PDSN indicating that the lifetime of the packet-data connection is zero (0); and releasing the packet-data connection by the PDSN in response to the indication from the PCF.

In yet another aspect, the present invention is a method of optimizing the use of packet-resources by eliminating a hanging packet-data connection when an authentication failure is received for an MS after the packet-data connection is established between the MS and the PDSN. The method includes the steps of sending an indication of the authentication failure from the MSC to the BSC; sending from the BSC, an instruction to the PCF to release its connection with the BSC due to authentication failure; clearing by the PCF, its connection with the BSC, and initiating closure of its connection with the PDSN in response to the instruction from the BSC; and releasing the packet-data connection by the PDSN in response to the closure of the connection from the PCF.

In yet another aspect, the present invention is a method of optimizing the use of packet-resources by eliminating a hanging packet-data connection when an authentication failure is received for an MS after the MS performs an intra-BSC/intra-PCF/inter-PDSN dormant handoff. The method includes the steps of sending an indication of the authentication failure from the MSC to the BSC; sending from the BSC, an update message to the PCF that includes an identity of the MS and an indication that authentication failed for a dormant packet-data session; sending an indication from the PCF to the PDSN indicating that the lifetime of the packet-data connection is zero (0); and releasing the packet-data connection by the PDSN in response to the indication from the PCF.

In yet another aspect, the present invention is an MSC in a wireless access network that includes a first signaling means for receiving a message from a BSC indicating that an MS has powered down during a packet-data session; means for determining in the MSC that the packet-data session is dormant; and a second signaling means for sending an instruction to the BSC to release network resources associated with the packet-data session.

In yet another aspect, the present invention is a BSC in a wireless access network that includes a first signaling means for receiving a power-down registration from an MS when a packet-data session is dormant; and a second signaling means for sending from the BSC, an update message to a PCF that instructs the PCF to release resources associated with the packet-data session due to the MS powering down. The BSC may also include a third signaling means for sending a location updating message from the BSC to an MSC to initiate a release of radio resources, the location updating message being sent simultaneously with the update message sent from the BSC to the PCF.

In yet another aspect, the present invention is a BSC in a wireless access network that includes a first signaling means for receiving a message from an MSC indicating that authentication failed for an MS involved in a dormant packet-data session; and a second signaling means for sending from the BSC, an instruction to the PCF to release its connection with the BSC due to authentication failure.

In yet another aspect, the present invention is a system for optimizing the use of packet-resources in a wireless access network by eliminating a hanging packet-data connection at a PDSN when an MS performs a power-down while a packet-data session is in a dormant state. The system includes an MSC that comprises a first signaling means for receiving a message from the BSC indicating that the MS has powered down, and a second signaling means for sending an instruction to the BSC to release network resources associated with the packet-data session. The system also includes a BSC that receives the instruction from the MSC and sends a release instruction to a PCF to release packet-data resources. The PCF releases its connection to the BSC and initiates closure of its connection to the PDSN in response to the release instruction received from the BSC. The PDSN, in turn, releases the packet-data connection in response to the PCF initiating closure of its connection to the PDSN.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
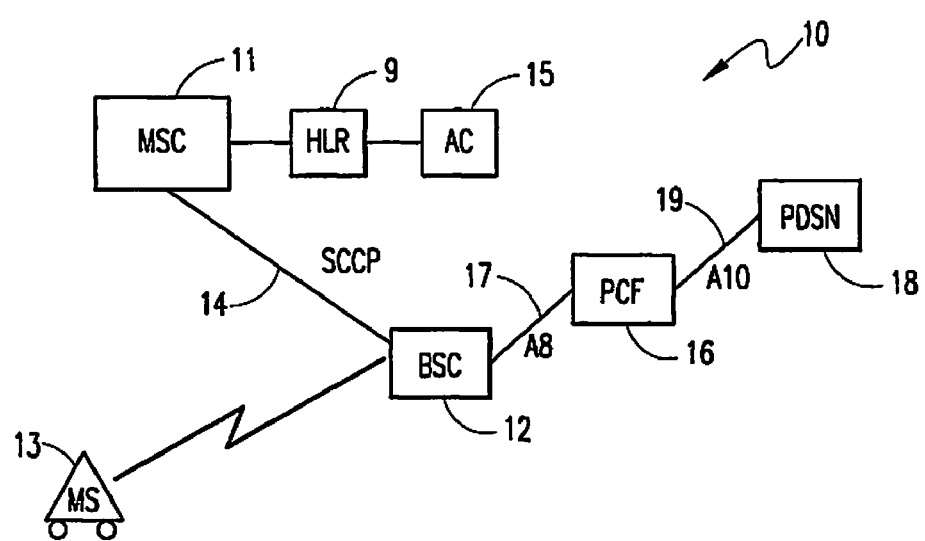
FIG. 1 is a simplified block diagram of a wireless access network suitable for implementing the method of the present invention.

FIG. 1 is a simplified block diagram of a wireless access network 10 suitable for implementing the method of the present invention. An MSC 11 and a BSC 12 serve the service area in which an MS 13 is operating. The MSC and the BSC interface over a connection-oriented Signaling Connection Control Part (SCCP) interface 14. The network also includes an Authentication Center (AC) 15 which may be stand-alone as illustrated, or co-located with a Home Location Register (HLR) 9. Likewise, a PCF 16 may be co-located with the BSC, or may be implemented elsewhere as illustrated. The PCF interfaces with the BSC over an A8 interface 17. A PDSN 18 provides the MS with packet-data services, and interfaces with the PCF over an A10 interface 19.

The present invention makes use of existing and modified versions of currently used messages, and also adds an additional new message on an A8/A9 interface between the MSC 11 and the BSC 12. The invention optimizes the use of packet-resources in wireless access networks by eliminating hanging PPP connections both when an MS powers down during a dormant PPP session, and when an authentication failure is reported at the MSC after a data path is set up.

MS Dormant Power-Down

There are two options for handling the situation in which the MS 13 powers down during a dormant packet-data session. The first option is BSC-centric, and the other is MSC-centric. The BSC-centric case does not need the intervention of the MSC 11. The BSC 12 has the intelligence to determine that it must inform the PCF 16 that the PCF needs to release the resources associated with the PPP session. This triggers the release of the PPP connection by the PDSN 18.

A more elegant solution is to have the MSC control the release. When the MS performs a dormant power-down, the MS informs the BSC by sending a power-down registration on the control channel. The BSC then sends a Location Update Request to the MSC with the power-down notification. The MSC checks to see if the MS is hosting a packet-data session, and if so, determines whether the packet-data session is dormant. The MSC may determine that the session is dormant if the MSC has previously received a Clear Request from the BSC requesting deallocation of radio resources due to the packet call going dormant. If the session is dormant, the MSC sends the BSC a Location Update Accept message and includes parameters that instruct the BSC to release the resources associated with the PPP session.

Figure 2:
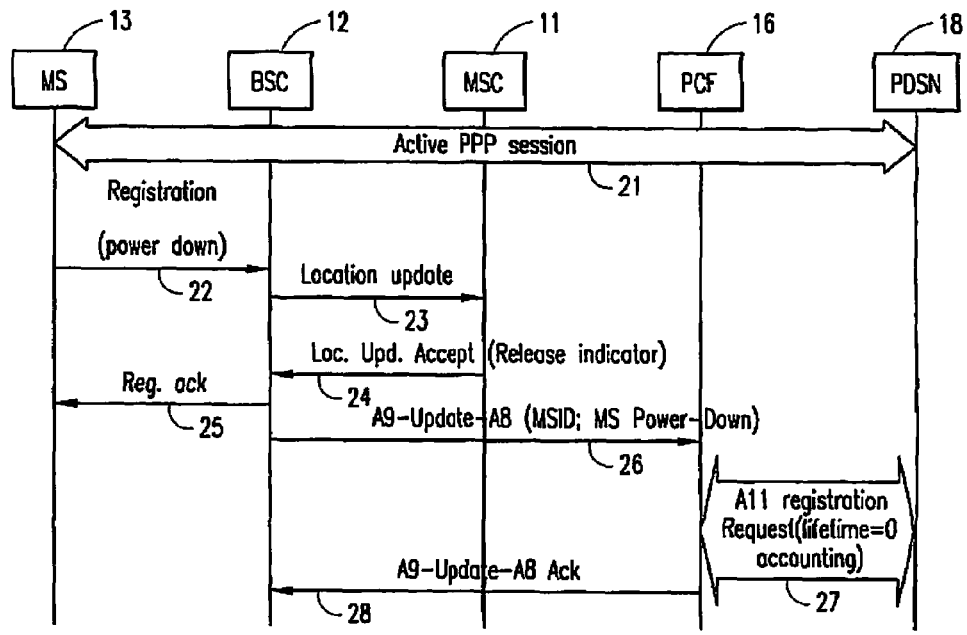
FIG. 2 is a signaling diagram illustrating the flow of messages between nodes in the wireless access network of FIG. 1 when a mobile station powers down during a dormant packet-data session in a first embodiment of the method of the present invention.

FIG. 2 is a signaling diagram illustrating the flow of messages between nodes in the wireless access network of FIG. 1 when the MS powers down during a dormant packet-data session in a first embodiment of the method of the present invention. In this embodiment, the release is initiated by the MSC 11. At step 21, an active PPP session exists between the MS 13 and the PDSN 18. The session is dormant (i.e., no data is currently being transferred over the PPP session). At step 22, the dormant MS powers down and sends a power-down registration to the BSC 12. The BSC may not be aware that the packet-data session is dormant, and there is no A8 connection established with the PCF. The BSC triggers a Location Update Request 23 towards the MSC indicating that the MS has powered down. The MSC, which has previously received a Clear Request from the BSC (or an Assignment Failure indicating "packet call going dormant"), responds by sending a Location Update Accept message 24 to the BSC. The Location Update Accept message includes a Release indicator informing the BSC that a dormant packet call is to be released as well. At step 25, the BSC sends a Registration Acknowledgment to the MS.

In parallel, the BSC 12 checks the Release indicator received in the Location Update Accept message, and determines the necessity to inform the PCF 16 that the MS has now powered down. Therefore, at step 26, the BSC triggers an A9-Update-A8 message to the PCF containing an identifier of the MS (MSID) and the UpdateReason parameter set to "MS Power Down". At 27, the PCF uses the MSID received in the A9-Update-A8 message to find the corresponding A10 connection. The PCF starts releasing the A10 connection by sending an A11 Registration Request. Thus, the PCF sends an A11 Registration Request message to the PDSN with lifetime set to zero (0). The PDSN releases the A10 connection as well as the active PPP connection, and a Registration Reply is returned to the PCF containing lifetime=0. At step 28, the PCF returns an A9-Update-A8 Acknowledgment message back to the BSC.

Figure 3:
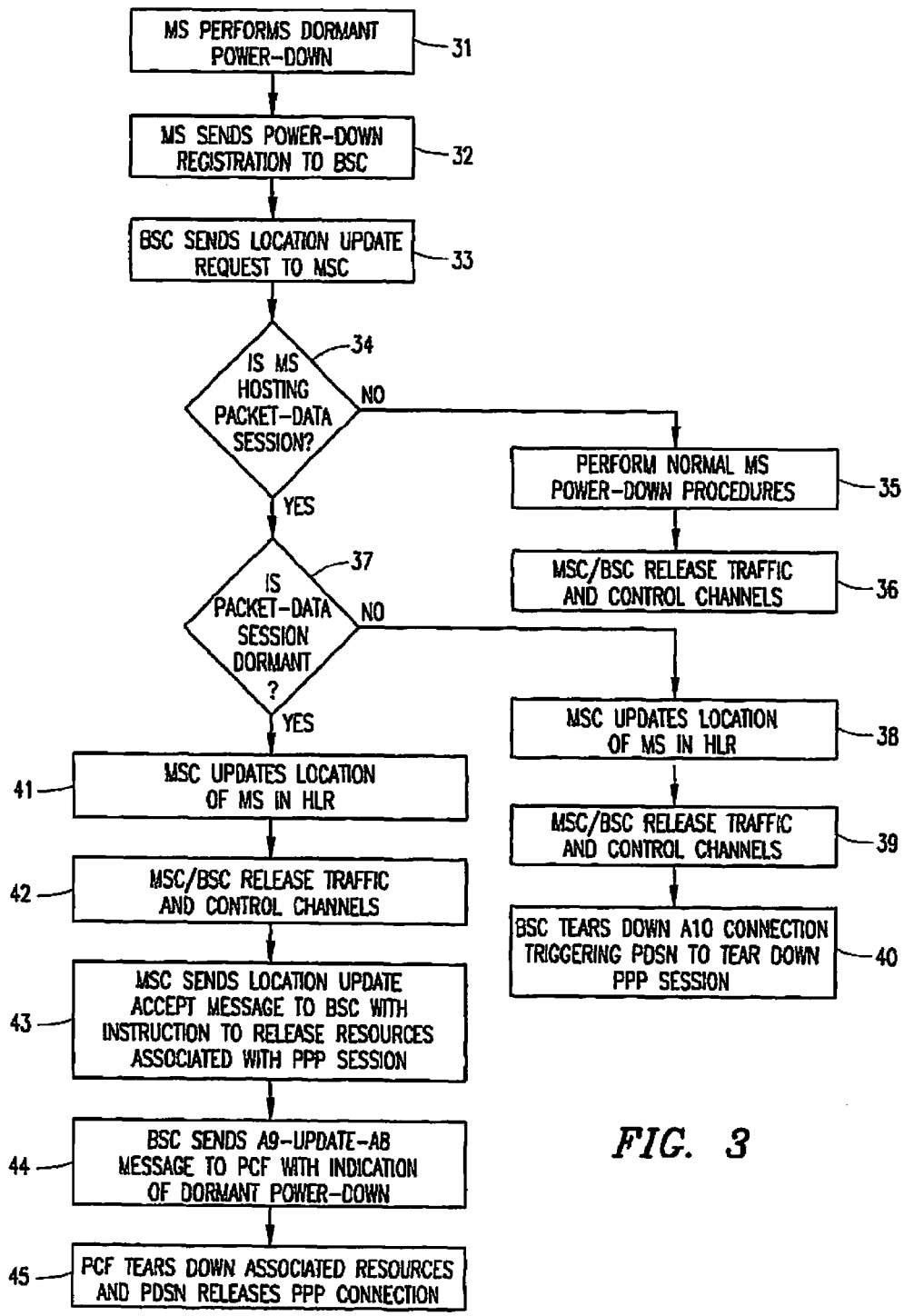
FIG. 3 is a flow chart illustrating the steps of the method illustrated in the signaling diagram of FIG. 2.

FIG. 3 is a flow chart illustrating the steps of the method illustrated in the signaling diagram of FIG. 2. At step 31, the MS 13 performs a dormant power-down, and at 32, sends a power-down registration to the BSC 12. At 33, the BSC sends a Location Update Request to the MSC 11. The method then determines whether or not the MS is hosting a packet-data session at 34. If not, normal MS power-down procedures are followed at 35, and the MSC instructs the BSC to release the traffic and control channels that are allocated to the MS at 36.

If it is determined at step 34 that the MS 13 is hosting a packet-data session, the method moves to step 37 where it is determined whether or not the packet-data session is dormant. If not (i.e., the session is active), normal MS power-down procedures and PPP tear-down procedures are followed. The method moves to step 38 where the MSC 11 updates the location of the MS in the MS's HLR, and then instructs the BSC 12 to release the traffic and control channels that are allocated to the MS at 39. The BSC tears down the A10 connection which triggers the PDSN 18 to tear down the PPP session at step 40.

If it is determined at step 37 that the packet-data session is dormant, the method moves to step 41 where the MSC updates the location of the MS in the MS's HLR, and then instructs the BSC to release the traffic and control channels that are allocated to the MS at 42. At step 43, the MSC sends a Location Update Accept message to the BSC and includes an instruction to release the resources associated with the PPP session. At 44, the BSC sends an A9-Update-A8 message to the PCF 16 with an indication of the dormant power-down by the MS. In response, the PCF tears down the associated resources, and the PDSN releases the PPP connection at step 45.

Figure 4:
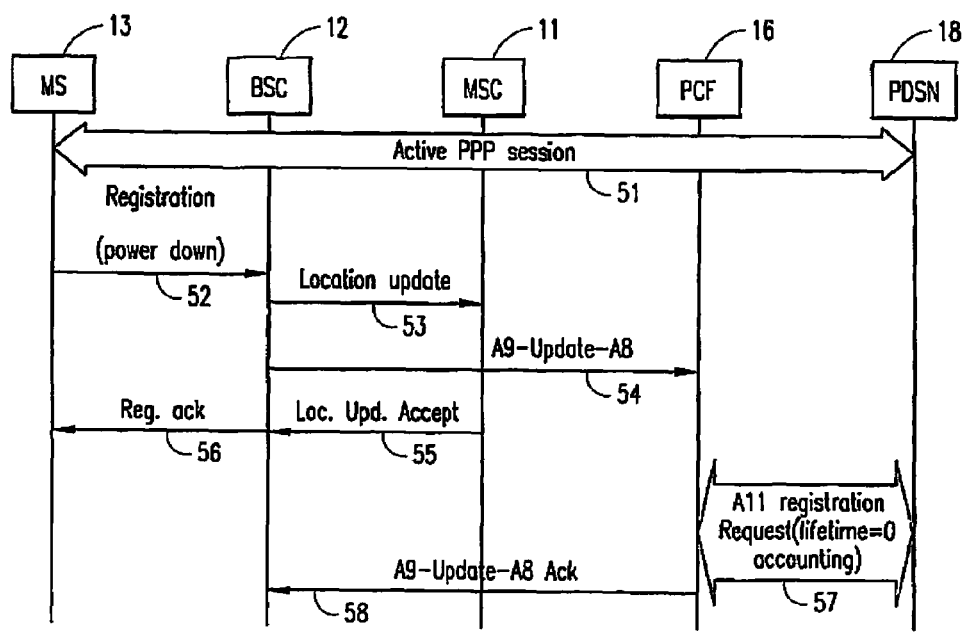
FIG. 4 is a signaling diagram illustrating the flow of messages between nodes in the wireless access network of FIG. 1 when a mobile station powers down during a dormant packet-data session in a second embodiment of the method of the present invention.

FIG. 4 is a signaling diagram illustrating the flow of messages between nodes in the wireless access network of FIG. 1 when the MS 13 powers down during a dormant packet-data session in a second embodiment of the method of the present invention. In this embodiment, the release is initiated by the BSC 12. At step 51, an active PPP session exists between the MS 13 and the PDSN 18. The session goes dormant (i.e., no data is currently being transferred over the PPP session), and the BSC releases the radio resources. At step 52, the dormant MS powers down and sends a power-down registration to the BSC. The BSC may know that the packet-data session is dormant, or it may merely inform the control entities (the PCF and the MSC) that the MS has powered down. As shown in FIG. 4, the BSC simultaneously triggers a Location Update Request 53 towards the MSC indicating that the MS has powered down, and triggers an A9-Update-A8 message 54 to the PCF also indicating that the MS has powered down. The MSC responds to the Location Update Request with a Location Update Accept message 55 (without the Release indicator). The BSC then returns a Registration Acknowledgment 56 back to the MS.

At step 57, the PCF simultaneously triggers an All Registration Request to the PDSN with lifetime set to zero (0) to release the A10 connection. The PDSN responds with an All Registration Reply, and disconnects the A10 connection and the associated PPP connections. At 58, the PCF returns an A9-Update-A8 Acknowledgment back to the BSC.

Figure 5:
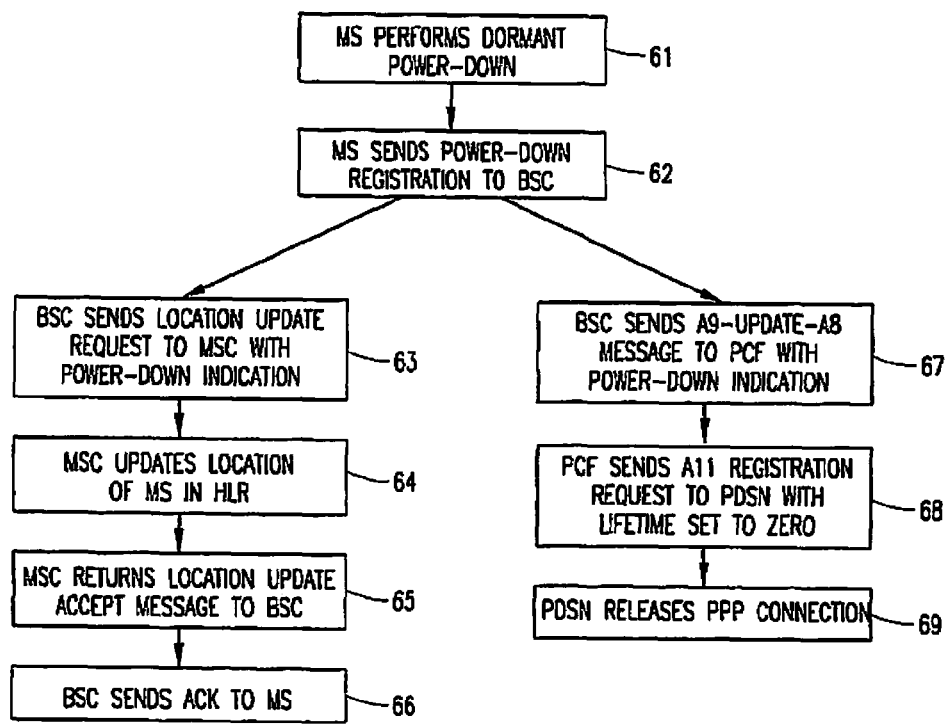
FIG. 5 is a flow chart illustrating the steps of the method illustrated in the signaling diagram of FIG. 4.

FIG. 5 is a flow chart illustrating the steps of the method illustrated in the signaling diagram of FIG. 4. The packet session has gone dormant, and at step 61, the MS 13 performs a dormant power-down. At step 62, the MS sends a power-down registration to the BSC 12. The BSC then simultaneously triggers a Location Update Request towards the MSC 11 at step 63, and triggers an A9-Update-A8 message to the PCF 16 at 67. The Location Update Request indicates that the MS has powered down. At step 64, the MSC responds by updating the location of the MS in the MS's HLR, and at step 65, the MSC returns a Location Update Accept message to the BSC (without the Release indicator utilized in the MSC-centric case). At 66, the BSC then returns a Registration Acknowledgment back to the MS.

At step 67, the BSC sends the A9-Update-A8 message to the PCF 16 simultaneously with the Location Update Request sent to the MSC at 63. The A9-Update-A8 message also contains an indication that the MS has powered down. At 68, the PCF triggers an A11 Registration Request to the PDSN 18 with lifetime set to zero (0) to release the A10 connection. At step 69, the PDSN responds by releasing the PPP connection.

It is evident that the second embodiment illustrated in FIGS. 4 and 5 affects one less node than the first embodiment illustrated in FIGS. 2 and 3. In the second embodiment, the MSC is not affected since the power-down registration 52 triggers the BSC to send the A9-Update-A8 message 54 to the PCF indicating that the MS has powered down, and thus resources at the PDSN should be cleared.

The state of the packet-data session may be maintained at either the PCF or the BSC. If the state information is maintained at the PCF, all power-down situations will trigger the BSC to send the A9-Update-A8 message to the PCF, even if the terminated call was a circuit-switched voice call, or even if the PPP connection has already been graciously torn down before power-down. In such cases where the message is not needed, the PCF will merely ignore it. Although this solution involves fewer nodes in the network, it may not be the most efficient from the signaling perspective since some unnecessary messages may be sent from the BSC to the PCF. However, this inefficiency may be avoided by maintaining the state of the packet-data session at the BSC. If the call that is terminated at MS-power-down is associated with a voice call, or if the PPP connection has already been graciously torn down, the BSC does not have to take any action related to the PDSN because it does not have a binding for that. However, if the call is associated with a packet-data session, and the session is dormant, the BSC sends the message to the PCF.

The first embodiment, although it affects an additional node (the MSC), guarantees that the message is sent to the PCF only in situations where it is necessary. Vendors may chose to adopt either embodiment based on their own specific implementation and hence at their own discretion.

Authentication Failure After PPP Establishment

Referring again to FIG. 1, when the MS 13 requests a packet-data session, it sends an origination message to the BSC 12. The BSC sets up the connection-oriented SCCP connection 14 with the MSC 11 to request an authentication. The MSC begins the authentication with the AC 15, and sends an Assignment Request to the BSC requesting that a traffic channel be allocated.

The BSC allocates a traffic channel to the MS and, in parallel, sets up the A8 connection 17 with the PCF 16. The PCF sets up the A10 connection 19 with the PDSN 18, and the PDSN then negotiates the setup of the PPP session. If the AC then reports an authentication failure, the MSC uses the connection-oriented SCCP connection to send a Clear command to the BSC. The BSC then releases the associated packet-data resources.

However, in some cases, the connection-oriented SCCP connection 14 may have been terminated, and therefore is not available for sending the Clear command. For example, if the packet-data session is dormant, which may occur after a dormant handoff, the PCF 16 and the PDSN 18 know that there is no data to be exchanged. So the PCF responds to the BSC 12 that a traffic channel is not needed. The BSC then sends an Assignment Failure message to the MSC 11, and no traffic channel is allocated. In this case, the connection-oriented SCCP connection with the MSC is terminated.

At some later time after the PPP session is set up, the AC 15 may report an authentication failure. However, there is no longer an SCCP connection for the MSC to use to instruct the BSC to release the PPP connection. In the present invention, the MSC uses a class-0 connectionless message to send the Clear command to the BSC.

During a dormant inter-BSC handoff to the BSC 12, the MS 13 sends a new origination message to the BSC 12 and PCF 16. The BSC sends an Assignment Request to the MSC 11 which returns an Assignment Command. The BSC attempts to set up an A8 connection with the PCF, but since the PCF knows that it does not need a traffic channel, it responds that it does not need an A8 connection. The BSC then sends an Assignment Failure message to the MSC 11. If in the meantime, the result of the authentication is known to the MSC, it sends a Clear command to the BSC. The BSC then sends an A9-Update-A8 message to the PCF instructing it to release the associated packet-data resources. This message can be used anytime the BSC needs to communicate with the PCF, including when there is no A8 connection between the BSC and the PCF.

Figure 6:
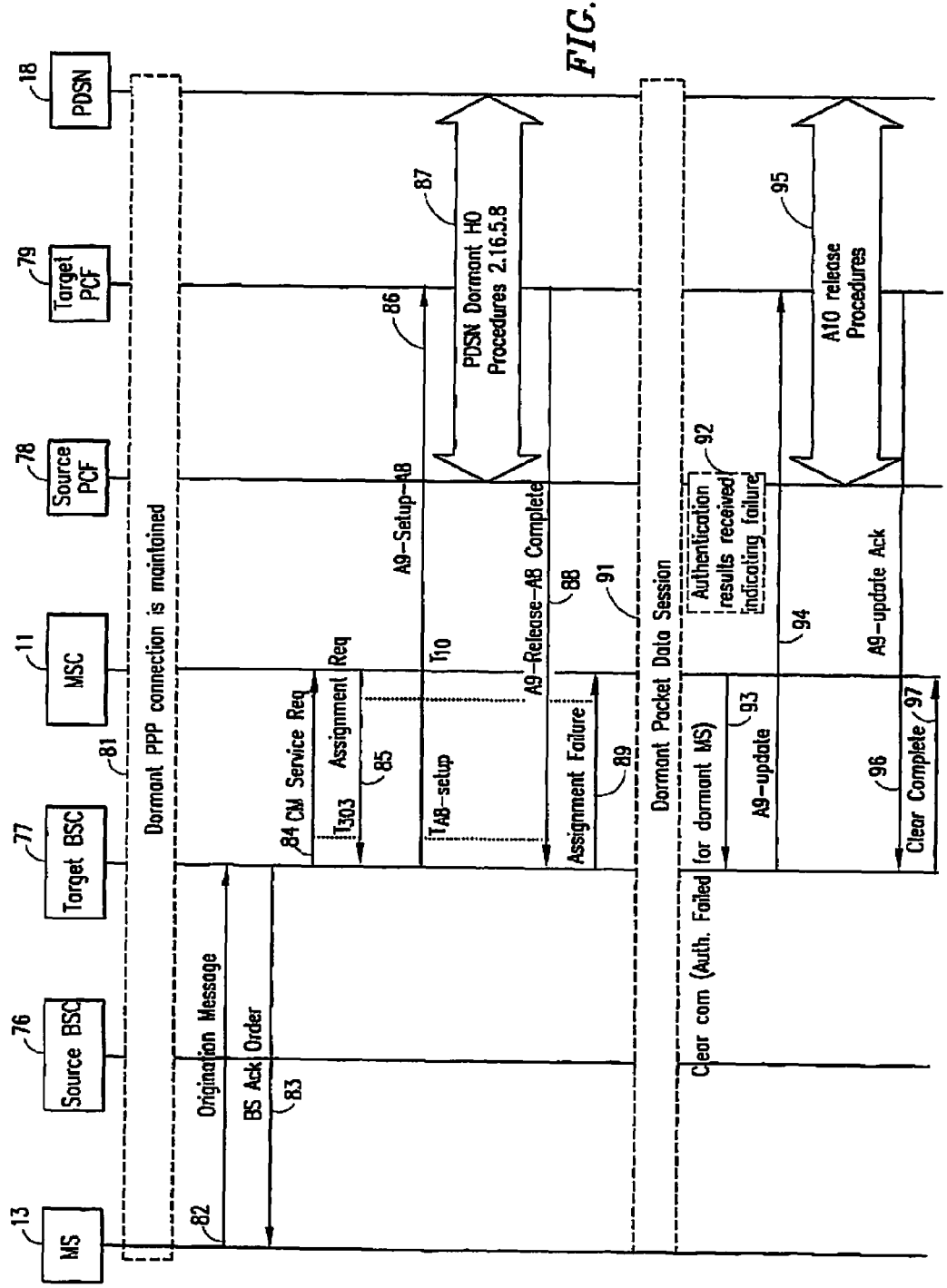
FIG. 6 is a signaling diagram illustrating the flow of messages between nodes in a wireless access network when there is an authentication failure following the establishment of a packet-data session in a third embodiment of the method of the present invention.

FIG. 6 is a signaling diagram illustrating the flow of messages between nodes in a wireless access network when there is an authentication failure following the establishment of a packet-data session in a third embodiment of the method of the present invention. In particular, FIG. 6 illustrates the situation in which an inter-BSC/inter-PCF/intra-PDSN dormant handoff is performed from a Source BSC 76 to a Target BSC 77, and from a Source PCF 78 to a Target PCF 79. The MS 13 is served by the same PDSN 18, and the authentication failure occurs in the MSC 11 following an Assignment Failure. It is assumed that the PCF has only one Packet Zone ID. It is also assumed that the MS has performed a MIP registration and established a PPP connection with the PDSN, but is now dormant, as shown at 81.

The dormant MS detects a change of Packet Zone ID while monitoring the broadcast channel and initiates an Origination message 82 with the DRS bit set to zero (0). The Target BSC will not establish a traffic channel when it receives an origination with DRS set to 0. At step 83, the Target BSC 77 acknowledges the receipt of the Origination message by sending a Base Station Acknowledgment Order to the MS. The Target BSC then constructs a CM Service Request message 84, places it in a Complete Layer 3 Information message, sends the message to the MSC, and starts timer T303. The CM Service Request message includes authentication data which the MSC uses to start its authentication procedure while also instructing the Target BSC to assign necessary resources.

The MSC 11 then sends an Assignment Request message 85 to the Target BSC 77 to request assignment of radio resources and starts timer T10. Upon receipt of the Assignment Request message, the BSC stops timer T303. The MSC starts an authentication procedure and waits for the results. The Target BSC then sends an A9-Setup-A8 message 86, with Data Ready Indicator set to 0, to the Target PCF 79 and starts timer TA8-setup. At step 87, the target PCF establishes an A10/A11 link, and the PDSN 18 disconnects the old A10/A11 link in accordance with the procedure in 2.16.5.8. If the PDSN has data for the MS, the PDSN responds to the PCF with a Registration Reply message with the Data Available Indicator in the Vendor/Organization Specific Extension.

The Target PCF 79 then notifies the Target BSC that a traffic channel and an A8 connection are not necessary by sending the Target BSC 77 an A9-Release-A8 Complete message 88. The Target BSC then stops timer TA8-setup and sends an Assignment Failure message 89 to the MSC 11 with a Cause value indicating Packet Call Going Dormant. The MSC then stops timer T10.

At 91 it is indicated that the packet data session remains dormant when the MSC 11 finally receives, at step 92, the authentication result from the AC 15 indicating that the authentication has failed. At this point, the MSC needs to send a Clear command to the Target BSC 77 indicating that the authentication has failed for the dormant packet call. However, the MSC no longer has an SCCP connection (A1 interface) on which to send an indication that the authentication resulted in a failure. Therefore the MSC cannot use the existing Clear command message since this message can only be sent over a connection-oriented connection in the DT1 (data transfer) field of the SCCP. Instead, the present invention sends the Clear command message (an A1 message) in the SCCP unit data message (UDT) in a connectionless (protocol class-0) transaction 93 (a transaction where there is no SCCP connection).

Thus, the MSC realizes that the packet call has gone dormant, and sends the Clear command 93 to the Target BSC 77 and includes the MSID for the MS 13, and a Release indicator indicating that the authentication has failed for the dormant packet call. The Target BSC then sends the Target PCF 79 an A9-Update message 94 containing the MSID and an UpdateReason parameter indicating "authentication failed for dormant packet call". The A9-Update message is utilized since there is no existing signaling message on the A8 interface while the packet session is dormant (other than a A9-Setup-A8 message which is used to initiate an A8 connection between the PCF and the BSC once the call goes active). The A9-Update message may also be upgraded with another cause value to reflect the MSC tearing down of a dormant packet-data session due to the detection of a fraudulent use of the service.

At step 95, the Target PCF starts an A10 release procedure. When a response is received from the PDSN 18, the Target PCF sends an A9-Update Acknowledgment message 96 back to the Target BSC. The Target BSC then sends a Clear Complete message 97 back to the MSC 11 indicating that resources for the packet-data call have been released.

Figure 7:
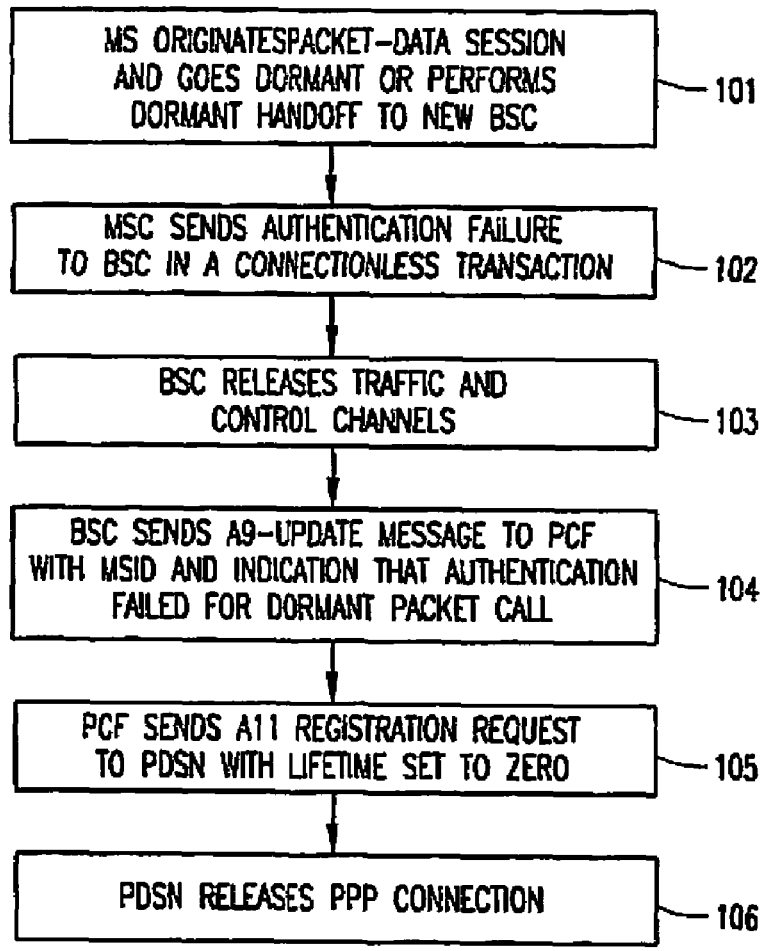
FIG. 7 is a flow chart illustrating the steps of the method illustrated in the signaling diagram of FIG. 6.

FIG. 7 is a flow chart illustrating the steps of the method illustrated in the signaling diagram of FIG. 6. At step 101, the MS 13 originates a packet-data session and then goes dormant, or the MS performs a dormant handoff to a new BSC. At some later time 102, the MSC sends an authentication failure indication to the BSC in an SCCP unit data message (UDT) in a connectionless (protocol class-0) transaction. At 103, the BSC releases the traffic and control channels that were allocated to the MS using normal procedures. At step 104, the BSC then sends, for example, an A9-Update message to the PCF with the MSID of the MS and an indication that authentication failed for a dormant packet call. At 105, the PCF triggers the PDSN to release the A10 connection by sending an A11 Registration Request to the PDSN with the lifetime set to zero (0). At step 106, the PDSN then releases the PPP connection.

Figure 8:
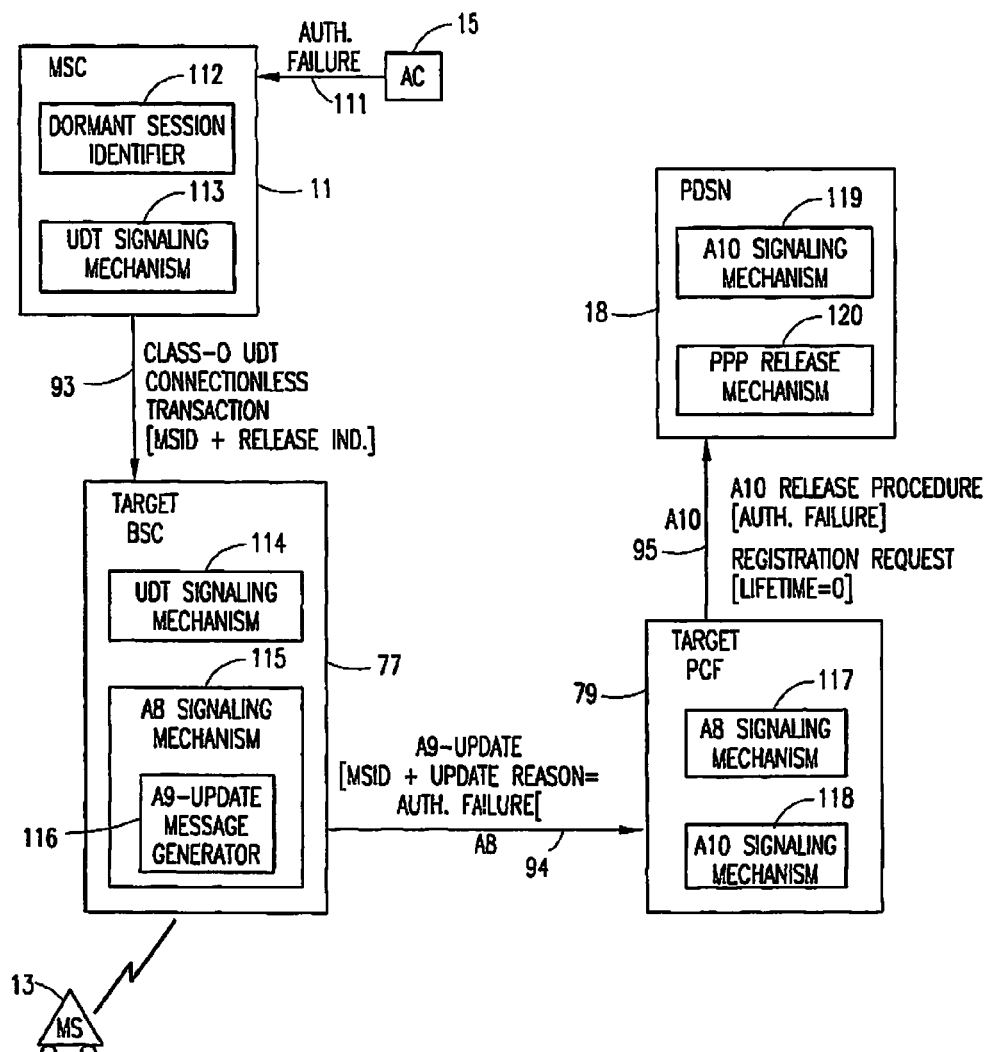
FIG. 8 is a simplified block diagram of a portion of a wireless access network in which the method illustrated in FIGS. 6 and 7 may be practiced.

FIG. 8 is a simplified block diagram of a portion of a wireless access network in which the method illustrated in FIGS. 6 and 7 may be practiced. In particular, FIG. 8 illustrates a network in which an inter-BSC/inter-PCF/intra-PDSN dormant handoff is performed to the Target BSC 77 and to a Target PCF 79. The MS 13 is served by the same PDSN 18, and an authentication failure 111 is reported by the AC 15 to the MSC 11 following an Assignment Failure. The MSC includes a dormant session identifier 112 which determines whether the authentication failure is associated with a dormant packet-data session. Essentially, if the MSC has an SCCP connection for the call (i.e, the call is active), the MSC uses it to send a Clear command to the Target BSC. If the MSC does not have an SCCP connection (i.e., the call is dormant), the MSC then uses a UDT signaling mechanism 113 to send a Clear command that includes an authentication failure indication to the Target BSC in an SCCP unit data message in a connectionless (protocol class-0) transaction 93.

In the case of a dormant call, the Target BSC 77 receives the UDT message with a UDT signaling mechanism 114. The Target BSC then uses an A8 signaling mechanism 115 and an A9-Update message generator 116 to send the A9-Update message 94 to the Target PCF 79 with the MSID of the MS and an indication that authentication failed for a dormant packet call. The Target PCF receives the A9-Update message with an A8 signaling mechanism 117, and uses an A10 signaling mechanism 118 to begin an A10 Release procedure 95 due to authentication failure. An A11 Registration Request is sent to the PDSN with the lifetime set to zero (0). The PDSN receives the message with an A10 signaling mechanism 119, and uses a PPP release mechanism 120 to release the PPP connection.

Figure 9:
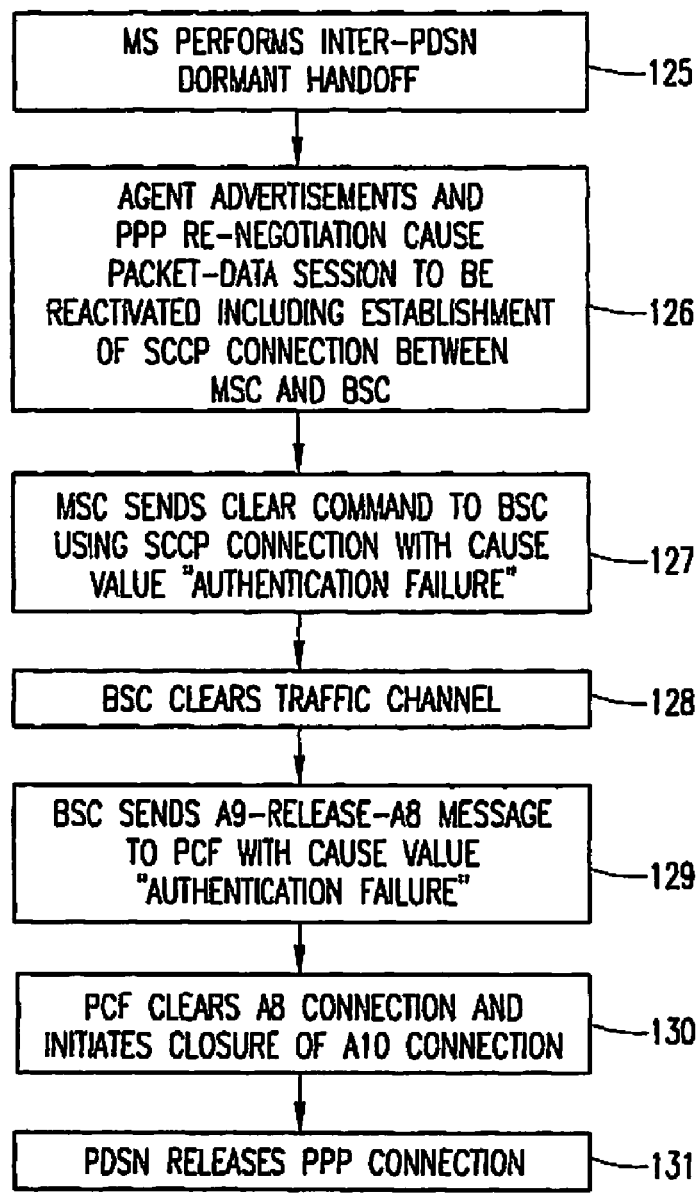
FIG. 9 is a flow chart illustrating the steps of the method when there is an authentication failure following an inter-PDSN dormant handoff.

FIG. 9 is a flow chart illustrating the steps of the method when there is an authentication failure following an inter-PDSN dormant handoff. At step 125, the MS performs an inter-PDSN dormant handoff. At 126, the packet-data session is reactivated due to the sending of agent advertisements and PPP re-negotiation. The reactivation includes the establishment of an SCCP connection 14 between the MSC 11 and the BSC 12. At 127, the MSC sends a Clear command to the BSC using the SCCP connection. The Clear command includes a cause value "authentication failure". The BSC reacts by clearing the traffic channel at 128, and at 129, sending an A9-Release-A8 message to the PCF 16. The A9-Release-A8 message includes the cause value "authentication failure". At 130, the PCF reacts by clearing the A8 connection 17 and initiating the closure of the A10 connection 19. This action triggers the PDSN 18 to release the PPP connection at step 131.

Note that the PDSN 18 has no way to find out if an MS undergoing dormant handoff came from another PDSN. Therefore the target PDSN always sends agent advertisements prompting the establishment of a traffic channel by the BSC 12. An SCCP connection 14 thus exists between the BSC 12 and the MSC 11 for that MS, and the MSC can send the Clear command message on the SCCP connection should the authentication result in a failure. Future versions of CDMA 2000, however, propose that the PDSN will only send agent advertisements when the PDSN deems it necessary. In this case, a intra-PDSN dormant handoff will not be accompanied by a reactivation of the packet session to an active state. The solution illustrated in FIGS. 6 and 7 then applies.

Note also that an inter-PDSN dormant handoff is always accompanied with a reactivation of the packet-data session to an active state either to negotiate a PPP connection or MIP registration. In that case, there is an existing SCCP connection 14 between the MSC 11 and the BSC 12 for the call, on which the Clear command can be sent to the BSC to clear the call. A new cause value ("authentication failure") is included in the Clear command, and the solution illustrated in FIG. 8 applies.

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

What is claimed is:

1. In a wireless access network having a Mobile Switching Center (MSC), a Base Station Controller (BSC), a Packet Control Function (PCF), and a Packet Data Service Node (PDSN) providing a packet-data session with a packet-data network, a method of optimizing the use of packet-resources by eliminating a hanging packet-data connection when an authentication failure is received for a Mobile Station (MS) after the packet-data connection is established between the MS and the PDSN, said method comprising the steps of:

sending an indication of the authentication failure from the MSC to the BSC;

sending from the BSC, an instruction to the PCF to release its connection with the BSC due to authentication failure;

clearing by the PCF, its connection with the BSC, and initiating closure of its connection with the PDSN in response to the instruction from the BSC; and releasing the packet-data connection by the PDSN in response to the closure of the connection from the PCF.

2. In a wireless access network having a Mobile Switching Center (MSC), a Base Station Controller (BSC), a Packet Control Function (PCF), and a Packet Data Service Node (PDSN) providing a packet-data session with a packet-data network, a method of optimizing the use of packet-resources by eliminating a hanging packet-data connection when an authentication failure is received for a Mobile Station (MS) after the MS performs an intra-BSC/intra-PCF/inter-PDSN dormant handoff, said method comprising the steps of:

sending an indication of the authentication failure from the MSC to the BSC;

sending from the BSC, an update message to the PCF that includes an identity of the MS and an indication that authentication failed for a dormant packet-data session;

sending an indication from the PCF to the PDSN indicating that the lifetime of the packet-data connection is zero (0); and releasing the packet-data connection by the PDSN in response to the indication from the PCF.

3. In a wireless access network having a Mobile Switching Center (MSC), a Base Station Controller (BSC), a Packet Control Function (PCF), and a Packet Data Service Node (PDSN) providing a packet-data session with a packet-data network, a method of optimizing the use of packet-resources by eliminating a hanging packet-data connection when an authentication failure is received for a Mobile Station (MS) after the MS performs an inter-PDSN dormant handoff, said method comprising the steps of:

reactivating the packet-data session;

sending an indication of the authentication failure from the MSC to the BSC;

sending from the BSC, an instruction to the PCF to release its connection with the BSC due to authentication failure;

clearing by the PCF, its connection with the BSC, and initiating closure of its connection with the PDSN in response to the instruction from the BSC; and releasing the packet-data connection by the PDSN in response to the closure of the connection from the PCF.

4. The method of optimizing the use of packet-resources of claim 3 wherein the step of sending an indication of the authentication failure from the MSC to the BSC includes sending a Clear command to the BSC using a Signaling Connection Control Part (SCCP) connection, the Clear command having a cause value of "authentication failure".

5. A Base Station Controller (BSC) in a wireless access network having a Mobile Switching Center (MSC), a Packet Control Function (PCF), and a Packet Data Service Node (PDSN) providing a Mobile Station (MS) with a packet-data session with a packet-data network, said BSC comprising:

a first signaling means for receiving a message from the MSC indicating that authentication failed for the MS when the packet-data session is dormant; and a second signaling means for sending from the BSC, an instruction to the PCF to release its connection with the BSC due to authentication failure.

6. A system for optimizing the use of packet-resources in a wireless access network by eliminating a hanging packet-data connection at a Packet Data Service Node (PDSN) when an authentication failure is received for a Mobile Station (MS) that is involved in a dormant packet-data session, said system comprising:

a Mobile Switching Center (MSC) comprising:
an authentication signaling means for receiving from an Authentication Center, an indication of the authentication failure for the MS; and
a Base Station Controller (BSC) signaling means for sending a message to a BSC indicating the authentication failure;

a Base Station Controller (BSC), said BSC comprising
an MSC signaling means for receiving a message from the MSC indicating the authentication failure for the MS; and
a Packet Control Function (PCF) signaling means for sending from the BSC, an instruction to a PCF to release its connection with the BSC due to authentication failure;

a PCF that releases its connection to the BSC and initiates closure of its connection to the PDSN in response to the release instruction received from the BSC; and a PDSN that releases the packet-data connection in response to the PCF initiating closure of its connection to the PDSN.

7. A system comprising:
a Mobile Switching Center (MSC) comprising:
means for receiving an authentication result from an authentication center indicating that authentication of a mobile station (MS) has failed; and
means for sending a Clear Command message to a Base Station Controller (BSC) indicating that authentication has failed the BSC comprising:
means for informing a Packet Control Function (PCF) via an A9-Update-A8 message containing an update reason parameter indicating "authentication failed"; and the PCF comprising:
means for starting an A10 release procedure using "authentication failed for dormant packet call" as a release indicator in an air-link record within an A11 registration request with lifetime='0'; and
means for, at response from a Packet Data Service Node (PDSN), sending an A9-Update-A8-Ack message back to the BSC.

8. A Base Station Controller comprising:
a signaling mechanism that:
receives a Clear Command message indicating that an authentication of a mobile station (MS) has failed;
informs a Packet Control Function (PCF) via an A9-Update-A8 message containing an update reason parameter indicating "authentication failed"; and
receives an A9-Update-A8-Ack message from the PCF.

9. A Packet Control Function (PCF) comprising:
a signaling mechanism that:
receives an A9-Update-A8 message containing an update reason parameter indicating "authentication failed", starts an A10 release procedure using "authentication failed for dormant packet call" as a release indicator in an air-link record within an A11 registration request with lifetime='0' and at response from Packet Data Service Node (PDSN), sends an A9-Update-A8-Ack message back to the BSC.

* * * * *

UNITED STATES PATENT AND TRADEMARK OFFICE
CERTIFICATE OF CORRECTION

PATENT NO.         : 7,630,354 B2                                                                                Page 1 of 1
APPLICATION NO. : 11/124238
DATED              : December 8, 2009
INVENTOR(S)        : Madour et al.

It is certified that error appears in the above-identified patent and that said Letters Patent is hereby corrected as shown below:

On the Title Page, in the Figure, above Tag "94", in Line 3, delete "FAILURE[" and insert -- FAILURE] --, therefor.

On the Title Page, in the Figure, for Tag "94", in Line 1, delete "AB" and insert -- A8 --, therefor.

In Fig. 7, Sheet 6 of 8, for Tag "101", in Line 1, delete "ORIGINATESPACKET" and insert -- ORIGINATES PACKET --, therefor.

In Fig. 8, Sheet 7 of 8, above Tag "94", in Line 3, delete "FAILURE[" and insert -- FAILURE] --, therefor.

In Fig. 8, Sheet 7 of 8, for Tag "94", in Line 1, delete "AB" and insert -- A8 --, therefor.

In Column 1, Lines 10-15, delete "This nonprovisional............Karim Shafik" and insert the same at Line 9, after "214." as a continuation.

In Column 8, Line 17, delete "the. BSC" and insert -- the BSC --, therefor.

In Column 10, Line 46, delete "a" and insert -- an --, therefor.

In Column 12, Line 20, in Claim 6, delete "comprising" and insert -- comprising: --, therefor.

In Column 12, Line 41, in Claim 7, delete "failed" and insert -- failed; --, therefor.

In Column 12, Line 67, in Claim 9, delete "failed"," and insert -- failed"; --, therefor.

Signed and Sealed this

Ninth Day of March, 2010

David J. Kappos
*Director of the United States Patent and Trademark Office*